Oct. 15, 1940.       A. RONNING       2,217,818
STEERABLE VEHICLE TRUCK
Filed Dec. 26, 1939
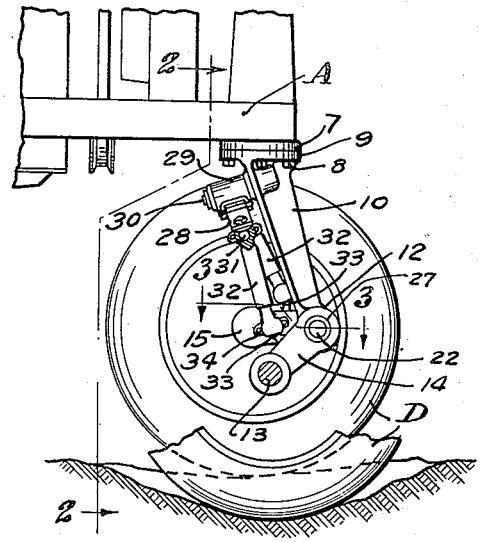
Fig-1-
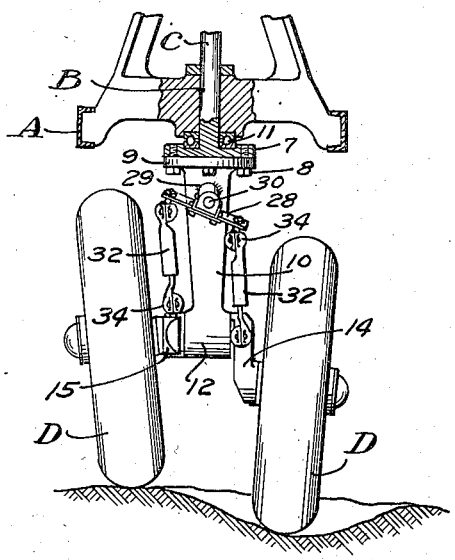
Fig-2-
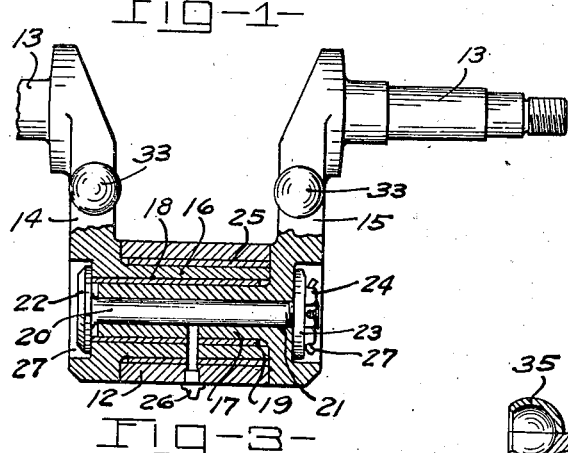
Fig-3-
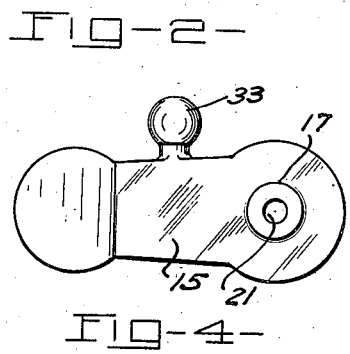
Fig-4-
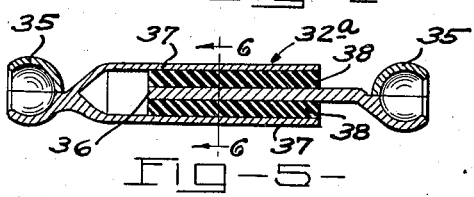
Fig-5-
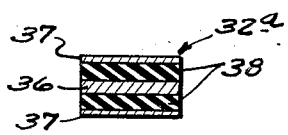
Fig-6-
INVENTOR
ADOLPH RONNING
BY Carlsen & Hazle
ATTORNEYS Patented Oct. 15, 1940

2,217,818

UNITED STATES PATENT OFFICE 2,217,818

STEERABLE VEHICLE TRUCK

Adolph Ronning, Minneapolis, Minn.

Application December 26, 1939, Serial No. 310,943

13 Claims. (Cl. 280—87)

This invention relates to improvements in steerable supporting trucks or units for vehicles, particularly of the self-propelled type, and the primary object of the invention is to provide a novel, effective and practical means for mounting a pair of closely spaced ground wheels so that they may be steered about a central upright steering axis but also providing for freedom of interdependent and differential up and down movements of the wheels to thereby equalize load distribution between the wheels as they travel over irregular ground surfaces. Another object is to provide a supporting means of this kind by which the ground wheels may rise and fall as required by the irregular ground surfaces in which they travel and with means absorbing any shocks or jars which may occur as the wheels meet such irregularities.

The present invention is similar in function and general operation to several other forms and modifications disclosed in my copending applications such as Serial No. 219,369, filed July 15, 1938; Serial Nos. 242,725 and 242,726, filed November 28, 1938 now Patents Nos. 2,208,599 and 2,208,600 of July 23, 1940; Serial No. 250,344 filed January 11, 1939, now Patent No. 2,209,094 of July 23, 1940, and Serial No. 297,292, filed September 30, 1939. Attention to these copending applications is invited for comparative purposes.

In the drawing:

Fig. 1 is a side elevation of the lower frontal portion of a tractor equipped with my invention, the wheels being shown as running over an irregular ground surface and the near wheel being in greater part removed to better disclose the structure.

Fig. 2 is a transverse vertical section along the line 2—2 in Fig. 1, additional bearing parts also being shown in section.

Fig. 3 is an enlarged fragmentary section taken approximately along the line 3—3 in Fig. 1, but with the wheels removed.

Fig. 4 is an enlarged inside elevational view of one wheel supported crank member.

Fig. 5 is an enlarged longitudinal section through a modified form of link, for connecting the crank members.

Fig. 6 is a cross section along the line 6—6 in Fig. 5.

Referring more particularly and by reference characters to the drawing, A represents the frame of a tractor, or vehicle, at the forward ends of which is provided a bearing B for the reception of an upright steering post C, said post being adjustable, as by conventional steering mechanism connected to its upper end and not here shown, about a substantially vertical axis for steering purposes; and the rear end of the tractor is supported by traction wheels (not shown) which in addition to propelling the tractor over the ground also impart thereto the necessary lateral stability. The front ground wheels D, connected by my invention to the post C as will appear, are accordingly closely spaced since they are not needed for lateral stability and since they may thus travel between crop rows in the use of the tractor for row crop work.

The lower end of the steering post C is flanged at 7 for the attachment thereto, as by screws 8, of the upper flanged end 9 of a mounting member 10, the said flange 7 bearing upwardly on a thrust bearing 11 to support the weight of the forward end of the tractor. The member 10 at its lower end is provided with a transversely axised journal or bearing 12 and the member angles forwardly, from its upper end downwardly, whereby this journal or bearing is located substantially ahead of the vertical axis (of post C) about which the entire unit is steered.

The wheels D are rotatably secured on spindles 13 extending rigidly from the rear ends of crank arms or members 14 and 15 disposed at opposite sides of the member 10 and journaled at their forward ends therein. For this purpose the forward ends of the crank arms 14 and 15 are provided with tubular stub shafts 16 and 17. One shaft 16 has a bore 18 sufficiently large to receive the other shaft 17 with an interposed, oil-bearing bronze bearing bushing 19 in place as shown in Fig. 3. The shafts are thus assembled coaxially in telescoped relation in the journal or bearing 12 and a bolt 20 is placed through the bore 21 of the inner and smaller shaft 17 so that its head 22 and large washer 23, held by nut 24, engage the respective crank arms and prevent them moving apart. Another bronze bearing bushing 25 is placed within the journal 12 to receive the assembled shafts, and a fitting 26 is provided for oiling as required. By the foregoing arrangement the crank arms 14 and 15 are mounted for independent oscillating movements in a vertical and longitudinal plane as will be evident, and the coaxial, interfitted assembly of the shafts 16 and 17 allows the crank arms to be mounted very close together to thus closely space the wheels D. The spindles 13 are sloped slightly in an outward direction to give the wheels D the necessary camber for steering purposes, and it will be evident that relative up and down movements of the wheels, about the axis of the shafts 16 and 17, will not disturb this camber nor cause a transverse frictional contact with the ground such as might interfere with the steering.

The crank arms 14 and 15 are recessed in their outer faces at 27 to receive and protect the bolt head 22 and washer and nut 23—24.

A differentially operating connecting mechanism is provided between the crank arms and comprises a flat spring connecting member, beam, or lever 28 which is pivoted intermediate its ends by a bearing or shackle 29 on a pin 30 extended rearwardly from the mounting member 10. This beam 28 is thus supported substantially crosswise of, between, and upwardly from the planes in which the crank arms 14 and 15 oscillate, and the ends of the beam carry balls 31 at their lower sides to which the upper ends of links 32 are pivotally connected. The lower ends of said links 32 are similarly connected to balls 33 on the upper edges of the crank arms 14 and 15 at substantially medial points thereon. The link ends are of course provided with sockets to receive the balls 31 and 33 and these sockets are of the usual sectional form retained in engagement with the balls by bolts or other fasteners 34, as clearly shown.

In operation as the weight of the tractor is imposed on the member 10 it will be distributed equally to the wheels D through the journal 12, shafts 16 and 17 and crank arms 14 and 15, and all of these parts will remain relatively stationary while the tractor moves over an even ground surface. The entire assembly may of course be steered about the upright steering axis at any time. As the tractor meets an irregular ground surface, as shown in Figs. 1 and 2, either wheel D may move upwardly and the resulting oscillation of the beam 28 through the links 32 will cause the other wheel to move downwardly an equal amount, the up and down differential action meanwhile equally distributing the load stresses to the wheels at all times. The ball and socket connections of the links 32 provide the necessary pivotal movement required by the action as will be evident, and the spring nature of the beam 28 provides sufficient resiliency to absorb any shocks from the wheels.

In lieu of the rigid links 32 I may employ links such as shown at 32a in Figs. 5 and 6, in which upper and lower ends are provided with the ball sockets 35 for mounting purposes. However, one end 36 of each length is fitted lengthwise and centrally within spaced sides or portions 37 of the other end and yieldable rubber buffers or blocks 38 are placed between the respective members and vulcanized to adjacent faces thereof. As a result the link has sufficient rigidity to properly actuate the crank arms and beam but is, however, resiliently yieldable in a lengthwise direction to a degree sufficient to absorb shocks or jars which might be occasioned as the wheels D move over the ground. These resilient or yieldable links may be used in connection with the spring beam 28 or may be used with a rigid beam as the sole shock absorbing means.

The lateral margins of the members 36—37, and 38 are free and exposed, as shown clearly in Fig. 6, in order to enhance the resiliency of the link structure.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. A vehicle supporting unit comprising a mounting member, a pair of wheel supported crank arms having telescoped stub shafts journaled in the mounting member whereby said arms may oscillate up and down with respect to the mounting member, and differentially operating mechanism connecting the arms.

2. A vehicle supporting truck comprising a mounting member, a pair of wheel supported crank members having stub shafts journaled in the mounting member for up and down oscillating movement of the crank members, one of the said stub shafts being tubular to telescopically receive and form a bearing for the other, and means differentially connecting the crank members.

3. A vehicle supporting device comprising a mounting member having a transverse bearing, a pair of wheel supported cranks journaled at their ends in telescoped relation in said bearing, and differential means connecting the cranks.

4. A vehicle supporting device comprising a mounting member having a transversely axised bearing, a pair of crank members disposed at opposite sides of the mounting member, ground wheels supporting the swingable ends of the cranks, telescoped stub shafts extended from the other ends of the crank members and journaled for coaxial oscillation in the bearing, means for retaining the stub shafts in such telescoped relation, and differential means connecting the crank members for relative up and down movements at their wheel supported ends.

5. A vehicle supporting device comprising a mounting member having a transverse bearing, a pair of wheel supported cranks, tubular members extended from the cranks and assembled in telescopic, journaled relation through opposite ends of the bearing, means for securing the tubular members against relative endwise displacement, and means differentially connecting the cranks.

6. A vehicle supporting device comprising a mounting member having a transverse bearing, a pair of wheel supported cranks, tubular members extended from the cranks and assembled in telescopic, journaled relation through opposite ends of the bearing, a bolt extending coaxially through the tubular members and engaging outer end parts thereof to retain them in operative telescoped positions, and differential acting means connecting the cranks to oscillate them in opposite directions about the axis of said tubular members.

7. A vehicle supporting device comprising a mounting member having a transverse bearing, a pair of wheel supported cranks, telescoped members extending from the cranks and journaled coaxially in the bearing, a bolt extending through the inner member and engaging outer surfaces of the cranks at its ends, the said outer surfaces of the cranks having recesses receiving and protecting the ends of the bolt, and means differentially connecting the cranks.

8. A steerable vehicle supporting truck comprising a mounting member oscillatable about a generally upright axis, a pair of wheel supported crank members having telescoped shafts journaled in the mounting member for oscillating movement about a substantially transverse axis, and lever acting means differentially connecting the crank members.

9. A steerable vehicle supporting truck comprising a mounting member movable about a substantially vertical steering axis and having a transverse bearing, a pair of wheel supported crank arms having telescoped shafts journaled in the bearing, and yieldable means differentially connecting the crank arms rearwardly of their journaled ends.

10. A steerable vehicle supporting truck comprising a mounting member movable about a substantially vertical steering axis and having a transverse bearing in its lower end disposed forwardly of said steering axis, a pair of cranks journaled at their forward ends in telescoped relation with respect to each other in the bearing, ground wheels supporting the rear ends of the cranks and normally disposed in axial alignment in the transverse plane of the steering axis, and means connecting the cranks for differential up and down movements at their wheel supported ends.

11. A vehicle supporting device, comprising a mounting member depending from the vehicle in a downwardly and forwardly disposed position and having a transversely axised bearing in its lower, forward end, a pair of crank arms journaled in the bearing, ground wheels rotatably secured to the rear ends of the crank arms, and means supported at the rear of the mounting member and differentially connecting the crank arms rearwardly of their journaled ends.

12. A steerable vehicle supporting truck comprising a mounting member movable about a substantially vertical axis, a pair of wheel supported crank arms journaled on the mounting member for oscillating movement in substantially vertical and longitudinal planes, a beam fulcrumed on the mounting member for oscillating movements in a transverse plane, and links extending between the beam and crank arms and pivotally connected thereto.

13. A steerable vehicle supporting truck comprising a mounting member movable about a substantially vertical axis, a pair of wheel supported crank arms journaled on the mounting member for oscillating movement in substantially parallel planes, a beam fulcrumed on the mounting member above the crank arms for up and down movement at its ends in a substantially transverse plane, and links extending in upright positions between the beam and crank arms and pivotally connected at their ends thereto.

ADOLPH RONNING.